Oct. 13, 1970   J. MELILL ET AL   3,533,153

METHOD OF FABRICATING SANDWICH-TYPE STRUCTURES

Filed Aug. 24, 1967

INVENTORS
JOSEPH MELILL, HAROLD J. GREENSPAN,
BY THOMAS E. DeWITT, CARL J. MUSER

ATTORNEY

United States Patent Office 3,533,153
Patented Oct. 13, 1970

3,533,153
METHOD OF FABRICATING SANDWICH-TYPE STRUCTURES
Joseph Melill, Rolling Hills Estates, Harold J. Greenspan, Los Angeles, Thomas E. DeWitt, Inglewood, and Carl J. Muser, Rolling Hills Estates, Calif., assignors to North American Rockwell Corporation, El Segundo, Calif.
Filed Aug. 24, 1967, Ser. No. 663,136
Int. Cl. B23p *17/00*
U.S. Cl. 29—423    11 Claims

ABSTRACT OF THE DISCLOSURE

A method of making a sandwich-type structure having at least a partially hollow core. Alternate layers of cover plates and core members are assembled and appropriate, removable spacer and support members provided. The resulting assembly is place in a thin-walled retort, heated, and a vacuum drawn, which causes deformation of the retort and the application of pressure to the assembly. The combination of pressure and temperature effects diffusion bonding of the sandwich structure.

BACKGROUND OF INVENTION

The present invention relates to a method of fabricating structural panels having high strength-to-weight ratios at elevated temperatures.

Sandwich-type panel structures are in widespread use for a number of applications where high strength-weight ratios are required, for example, in the aircraft and aerospace fields. Basically, these structures comprise load-bearing facing sheets separated and joined by means of honeycomb or corrugated cores, or by other ribbed-type stiffener members. A principal problem with all such structural panels has been the development of a strong and efficient bond between the cover sheets and the core members. Among the methods which have heretofore been employed by the art are welding, brazing, and adhesive bonding. All of these methods are deficient in one or more respects, including joint efficiency, undesirable metallurgical changes, temperature constraints, and assembly costs.

Another prior art method of producing ribbed, sandwich-type structures is disclosed in U.S. Pat. 3,044,160 (Jaffee). This patent describes a method of joining facing materials to ribbed cores by roll diffusion bonding, wherein solid state bonds are obtained between the facing materials and the ribs. In this method, alternate sheets of ribbed material and filler material are reduced by hot rolling between two cover sheets. The hot rolling achieves a size reduction of the structure and diffusion bonding between the cover sheets and the ribbed material. The spacer material is thereafter leached out with an acid. Drawbacks of this method include the need for a time-consuming and uneconomical leaching of the filler material, which is not reusable. Hot rolling of the sandwich assembly may also introduce distortions and irregularities into the panel structure, since the means for restraining the parts during rolling and bonding are not completely effective.

The pricipal object of the present invention, therefore, is to provide an improved method of fabricating integrally stiffened structural panels by diffusion bonding.

Aother object is to provide such a method wherein roll bonding and chemical leaching of spacer materials are not required, and spacer materials are reusable.

Another object is to provide an improved method for the diffusion bonding of integrally stiffened panels, including those with thin sections, in an economical, relatively rapid and reliable manner, wherein localized pressure magnification is obtained using atmospheric pressure, and parts are effectively restrained from movement during bonding.

Other objects and advantages of the present invention will become apparent from the following detailed description and the appended drawing.

SUMMARY OF INVENTION

Figure 1:
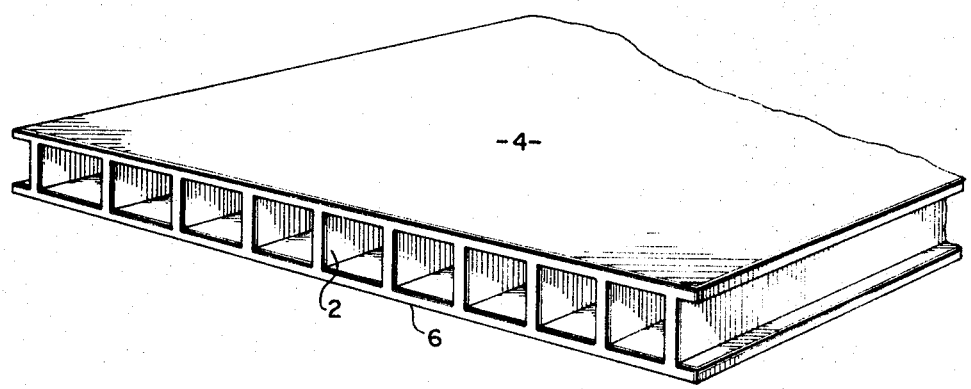
FIG. 1 is a schematic end view of a sandwich-type structure made by practice of the present invention.

In accordance with the present invention there is provided a method of making a ribbed, sandwich-type structure. Alternate layers of cover plates and core members are assembled, and spacer members are placed therein-between. The resulting assembly is then constrained, placed in a retort having thin walls which directly contact the outer surfaces of the assembly. A vacuum is drawn on the retort and it is heated at a temperature sufficient to effect diffusion bonding of the rib and cover plate members. The differential pressure between the atmosphere and the interior of the retort is sufficient to cause deformation of the retort and to apply pressure to the structural assembly herein. Thus, diffusion bonding is effected through the coordination of temperature and pressure. After the bonding operation is completed, the retort is opened and the spacer members are removed from between the cover plates and ribs. Through use of the present invention, structural panels with precise dimensional control, including tapered and converging structures, can be readily and economically fabricated.

DESCRIPTION OF PREFERRED EMBODIMENTS

The spacer members (hereinafter sometimes referred to as "tooling") serve a number of functions and possess numerous advantages in the practice of the present invention. The tooling is removable and therefore reusable, with consequent economic gain. The tooling is of a different metal than that of the sandwich-structure and may be coated with a stop-off compound, so that diffusion bonding does not occur therebetween. Further, because there is no hot rolling of the assembly, no distortions are induced in the structure which would make removal of the tooling by simple mechanical means (e.g., tapping with a hammer) difficult.

Moreover, the thermal expansion coefficients of the tooling are such as to aid in both restraint of the structural parts during bonding and in subsequent removal of the tooling. Thus, the tooling metal is so chosen that it will have a greater thermal expansion coefficient than the structural metal. For example, the thermal expansion coefficients of stainless steels are greater than of the refractory metals titanium or columbium, and the steel may be used as tooling in making a titanium or columbium sandwich structure. During the bonding operation, the steel will expand at a greater rate than the structural members upon the application of heat, thereby restraining and maintaining the geometric configuration of the structural members. This is especially desirable when the structure metal is thin or otherwise particularly prone to distortion. This differential thermal expansion characteristic also facilitates assembly of the tooling and structural members prior to bonding, because as tight a fit is not required and some slippage is permitted between members. Upon cooldown, the steel tooling contracts at a more rapid rate than the bonded structure and pulls away therefrom, which aids in removal of the tooling. When stainless steel is the structural member, a metal with a greater thermal expansion coefficient is used for the tooling, for example, ferritic steel.

Diffustion bonding is characterized by the formation of a metal-to-metal bond between contacting surfaces at suitable pressures and at temperatures below the melting point of the metal. Bonds which approach the strength of the parent metal can thereby be obtained. In certain cases a thin interleaf material or eutectic former, is provided, and in other forms of diffusion bonding no interleaf material is utilized. The mechanism of diffusion bonding is believed to involve plastic deformation of the metal, followed by surpassing of the compressive yield strength. This characteristic of plastic deformation under pressure and temperature may be taken advantage of in the present invention to produce a finished part having smooth surfaces without further work. Also, filets will be formed at the points of contact between cover plates and ribs, which strengthen the joint and eliminate crevices for debris collection.

A large number of metals may be self bonded or joined to dissimilar metals by diffusion bonding, and illustrative of these are aluminum, stainless steel, nickel, and refractory metals such as tantalum, molybdenum, zirconium and columbium, and alloys of the foregong. For further information on diffusion bonding, reference is made to such representative U.S. Pats. as 3,145,466; 3,180,022; 3,044,160; 2,850,798; 3,158,732; 3,170,234; and 3,242,565.

The present method achieves diffusion bonding of the structural members by the application of a high localized pressure at the points of contact between the cover plates and core members. Atmospheric pressure is utilized to achieve such pressure by drawing a vacuum and collapsing the retort housing the structural assembly. This is achieved, as will be seen in more detail below with reference to the drawing, by arranging for the ribs of the core to extend higher in the vertical plane than the spacer members. Tooling cover plates are positioned over the structural member cover plates, and when the vacuum is drawn, all the pressure is applied against the point where the vertical ribs meet the cover plates, thus achieving by point contact the requisite pressure for diffusion bonding. The ribs, doublers, and other stiffening sections may be positioned at any angle and need not be parallel to the direction of rolling, as in roll diffusion bonding. Likewise, structural members of varying thickness can be utilized.

The pressure at which bonding is achieved varies with the characteristics of the metal being bonded and the temperatures employed. For example, the minimum pressure for titanium is about 300 p.s.i., for stainless steel about 700 p.s.i., and for columbium about 3500 p.s.i. It is apparent that since the present invention achieves the requisite pressures by point contact means in joining cover plates to hollow, ribbed-type cores, that it would not be as suitable for joining flat surfaces of larges surface areas to each other. In such cases, presses would be needed.

The method of practicing the present invention will now be disclosed in greater detail with reference to the accompanying drawing and the following detailed description of making a sandwich type structure, which is intended as a specific example of the present invention. FIG. 1 shows a panel structure having a hallow, ribbed-type core defined by spaced-apart, parallel ribs 2. It is understood that other types of core configurations may be used, such as of honeycomb or other stiffener means which provide at least a partially hollow core. The ribs 2 are diffusion bonded to top and bottom face sheets 4 and 6 to complete the structure. In this example, the panel structure is of a 6 Al–4V-titanium alloy. The face sheets 4 and 6 are 0.025 inch thick and are separated by 0.040 inch titanium ribs 2. The ribs, cover sheets and tooling are arranged to give the assembly shown in FIG. 2. The assembly is held in such configuration by a frame and placed in a vacuum retort.

Figure 2:
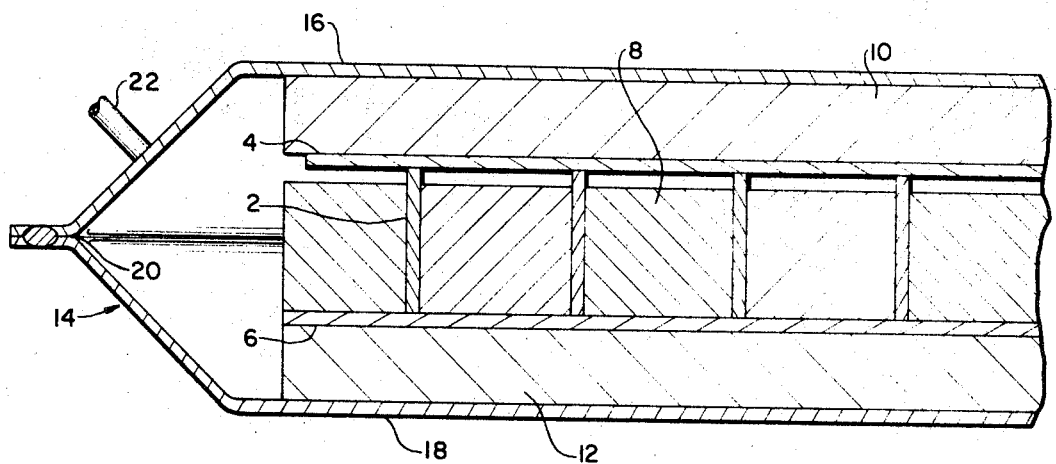
FIG. 2 is a cross section of a lay-up of structural and spacer members in a vacuum retort prior to diffusion bonding.

In more detail now, the ribs 2 are separated by means of spacer bars 8 of a 300 series stainless steel which are coated with a ceramic stop-off coating such as of alumina, in order to prevent bonding to the titanium members. The stainless steel members are first sand blasted, cleaned, and then flame-sprayed with alumina powder. Stainless steel members also serve as top and bottom pressure plates 10 and 12 and as a restraining frame (not shown) around the perimeter of the titanium assembly. In order to assure positive contact between ribs 2 and face sheets 4 and 6 and the application of a sufficient point contact pressure for diffusion bonding, ribs 2 extend higher in the vertical plane than spacer bars 8, as seen in FIG. 2. For example, the ribs are a minimum of about 0.020 inch higher than the spacer bars.

The retort 14 comprises two symmetrical hydroform pans 16 and 18 fabricated from 0.036 in.–0.050 in. thick 300 series austenitic stainless steel. The thin pan 16 contacts the top of pressure plate 10 of the tooling assembly, and is thereby able to exert a pressure upon the titanium assembly during the bonding operation. The pans are resistance seam welded (after lay-up of the assembly shown therein) at their point of contact 20 around the perimeter of the retort. The retort is provided with a stainless steel purge tube 22 welded to pan 16 and is tested for air-leak tightness after welding.

During the bonding operation a continuous vacuum is maintained. This provides a clean atmosphere necessary for bonding (surface oxidation of titanium and other metals prevents diffusion bonding), and the differential pressure causes deformation of the retort at temperature which provides the pressure for the intimate contact and diffusion bonding of the titanium members.

Following the evacuation of the retort, the diffusion bonding cycle is undertaken. As indicated previously, the time and temperature are coordinated and these parameters will vary with a number of factors, principally the nature of the metal being bonded and the thickness of the members being joined. As a general matter, in the case of the joining of titanium, it is found that a temperature of about 1650–1750° F. for a period of about three to five hours will result in efficient diffusion bonded joints, while a temperature of about 1700° F. for a period of about four hours is preferred.

Following completion of the diffusion bonding, the retort is opened. The stainless steel spacer and tooling members are readily separated from the resulting completed titanium sandwich panel. For example, these members may either be disassembled by hand or with light taps of a hammer or the like.

The foreging example should be understood as merely illustrative of the present invention. It is contemplated that within its scope various modifications may be made by those skilled in the art which are dictated by the particular structural geometries and materials involved. Therefore, the invention should be limited only as is indicated by the following claims.

We claim:
1. A method of making a metal sandwich-type structure having at least a partially hollow core, comprising:
 (a) providing an unbonded sandwich-type structure having spaced-apart metal cover plates and a core member disposed between and connecting said cover plates, said core member defining a cellular volume between said cover plates,
 (b) positioning tooling means, of a lesser height than the core member thereby defining hollow space between said spacer means and one of said cover plates, in contacting relationship with said sandwich structure, for spacing, support and restraint thereof,
 (c) placing the resulting assembly into a thin-walled metal retort,
 (d) drawing a vacuum upon and heating said retort at a sufficient temperature to effect diffusion bonding together of said sandwich-type structure,
 (e) and thereafter removing the resulting assembly from the retort and disassembling said tooling means to give the completed, bonded, sandwich-type structure.

2. The method of claim 1 wherein said tooling means comprise spacer means which are placed into said cellular volume, top and bottom pressure plates placed over said cover plates, and a perimeter frame adapted to restrain the resulting assembly from movement during the diffusion bonding operation.

3. The method of claim 1 wherein said tooling means are of a different metal than that of the sandwich-type structure and are adapted not to diffusion bond thereto.

4. The method of claim 3 wherein said tooling means is coated with a stop-off compound to prevent diffusion bonding of said tooling means and said structural members.

5. The method of claim 1 wherein the metal of said sandwich-type structure is selected from the class consisting of titanium, columbium, and their alloys and said tooling means and said retort are of stainless steel.

6. The method of claim 1 wherein said sandwich-type structure is of stainless steel and said tooling means is of a ferritic steel.

7. A method of making a sandwich-type structure of a refractory metal, comprising:
 (a) providing an unbonded sandwich-type structure of a refractory metal having cover plates and a core member disposed between and connecting said cover plates, said core member having structural support means which defines a cellular volume between said cover plates,
 (b) inserting stainless steel spacer means into said cellular volume, a stainless steel pressure plate over each of said cover plates, and a stainless steel frame therearound adapted to prevent movement of the resulting assembly, said core member extending beyond said spacer means thereby defining hollow space between said spacer means and said one of said cover plates,
 (c) inserting said assembly into a thin-walled stainless steel retort,
 (d) drawing a vacuum upon said retort in order to deform said retort and apply pressure upon said assembly, and heating said assembly at a temperature and for a period of time sufficient to effect the diffusion bonding together of said sandwich-type structure, and
 (e) removing the resulting assembly from said retort and disassembling it to give the completed, bonded sandwich-type structure.

8. A method of making a sandwich-type structure of a refractory metal, comprising:
 (a) providing an unbonded sandwich-type structure of a refractory metal having top and bottom cover plates and a core member disposed between and connecting said cover plates, said core member having structural support means which define a cellular volume between said cover plates,
 (b) inserting stainless steel spacer means into said cellular volume, a stainless steel pressure plate over each of said cover plates, and a stainless steel frame therearound adapted to prevent movement of the resulting assembly, said core member extending beyond said spacer means, thereby defining hollow space between said spacer means and said top cover plate,
 (c) inserting said assembly into a thin-walled stainless steel retort,
 (d) drawing a vacuum upon said retort in order to deform said retort and apply pressure upon said assembly, and heating said assembly at a temperature and for a period of time sufficient to effect the diffusion bonding together of said sandwich-type structure, and
 (e) removing the resulting assembly from said retort and disassembling it to give the completed, bonded sandwich-type structure.

9. The method of claim 7 wherein said stainless steel members are coated with a stop-off compound to prevent the diffusion bonding of said stainless steel and titanium members.

10. The method of claim 7 wherein said metal is titanium and said assembly is heated at a temperature of about 1650–1750° F. for a period of about 3–5 hours in order to effect said diffusion bonding.

11. A method of making a titanium sandwich-type structure, comprising:
 (a) providing an unbonded sandwich-type structure of titanium having cover plates and a core member disposed between and connecting said cover plates, said core member having structural support means which define a cellular volume between said cover plates,
 (b) inserting stainless steel spacer means into said cellular volume of a lesser height than said core member, a stainless steel pressure plate over each of said cover plates, and a stainless steel frame therearound adapted to prevent movement of the resulting assembly, said stainless steel members being coated with an aluminum oxide stop-off compound,
 (c) inserting said assembly into a thin-walled stainless steel retort,
 (d) drawing a vacuum upon said retort in order to deform said retort and apply pressure upon said assembly, and heating said assembly at a temperature of about 1650°–1750° F. for a period of about 3–5 hours in order to effect the diffusion bonding together of said titanium structure, and
 (e) removing the resulting assembly from said retort and disassembling it to give the completed, bonded sandwich-type structure.

References Cited

UNITED STATES PATENTS

| 2,851,770 | 9/1958 | Fromson | 29—423 |
| 3,044,160 | 7/1962 | Jaffee. | |
| 3,060,561 | 10/1962 | Watter | 29—423 |
| 3,105,285 | 10/1963 | Favre | 29—423 XR |
| 3,110,961 | 11/1963 | Melill et al. | 29—471.1 |
| 3,168,782 | 2/1965 | Cochran | 29—471.1 |
| 3,345,735 | 10/1967 | Nicholls | 29—471.1 XR |
| 3,365,787 | 1/1968 | Forsberg | 29—471.1 |
| 3,419,951 | 1/1969 | Carlson | 29—423 XR |

JOHN F. CAMPBELL, Primary Examiner

R. B. LAGARUS, Assistant Examiner

U.S. Cl. X.R.

29—455, 471.1, 472.1